Jan. 24, 1928.

R. L. FOSKIT 1,657,209

SAFETY DEVICE FOR AIRPLANES

Filed Sept. 2, 1927

Inventor
Romanzo L. Foskit
By Olsen & Olsen
Attorneys

Patented Jan. 24, 1928.

1,657,209

UNITED STATES PATENT OFFICE.

ROMANZO L. FOSKIT, OF TOLEDO, OHIO.

SAFETY DEVICE FOR AIRPLANES.

Application filed September 2, 1927. Serial No. 217,105.

This invention relates to airplanes, but particularly to airplanes equipped with helicopters, and the primary object is to enhance the safty of airplanes by providing auxiliary means capable of retarding the fall of the machine in case the main traction motor fails to function.

Another object is to provide an airplane with a helicopter which may be brought into use when required and automatically moved to a position when not in use to eliminate the resistance of the wind.

Figure 1:
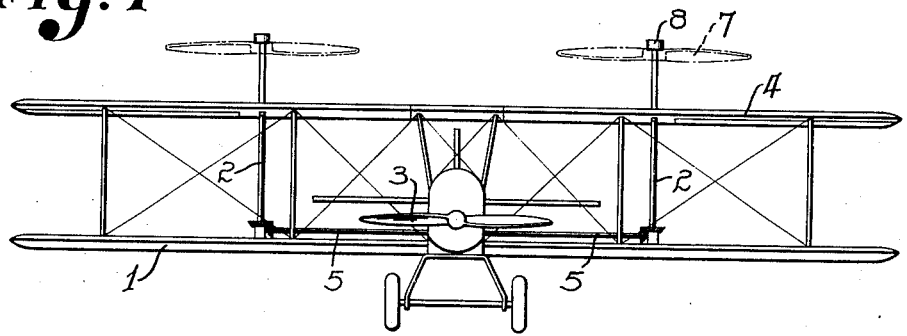
Figure 2:
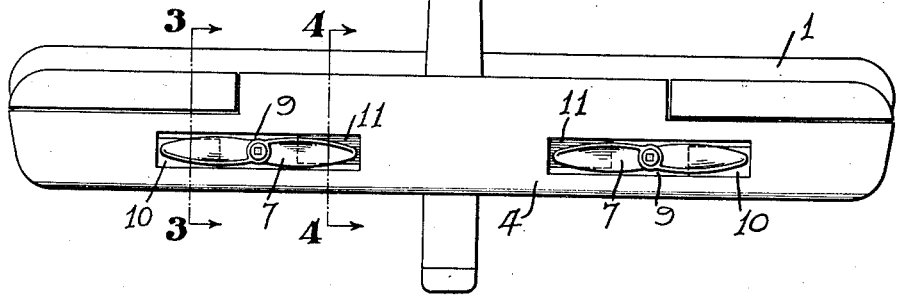
Figure 3:
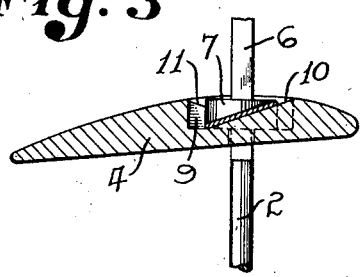
Figure 4:
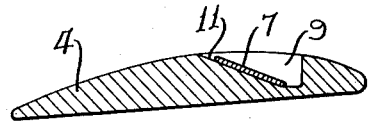

The invention is shown by way of illustration in the accompanying drawings, in which:

Fig. 1 is a front elevation of an airplane; Fig. 2 is a top plan view of the airplane shown in Fig. 1; Fig. 3 is a transverse section on the line 3—3 of Fig. 2, and Fig. 4 is a transverse section on the line 4—4 of Fig. 1.

The illustrated embodiment of the invention comprises an airplane 1 equipped with vertical helicopter driving shafts 2, there being two such shafts, one positioned at each side of the main traction propeller 3. If desired, the number of shafts 2 and helicopters may be varied in accordance with the demands of service. As shown, the shafts 2 extend through the upper wing 4 of the airplane, and may be driven at their lower ends by a horizontal drive shaft 5, suitably connected to a motor. As the operation of the shafts 2 forms no part of the present invention, detail description thereof is not considered necessary.

The upper end portions 6 of the shaft 2 are squared, and longitudinally slidable on those portions are helicopters 7, the upward movement thereof being limited by heads 8 fixed to the shafts.

It will be seen that by driving the helicopters 7, the airplane may be lifted vertically or may assist in the lifting of the airplane. Furthermore, the helicopter may be driven from a motor separate from the motor operating the main traction propeller 3, so that when the main motor becomes disabled, the auxiliary motor driving the shafts 2 may be brought into operation to allow the airplane to descend gradually, thereby eliminating the danger of crashing.

The wing 4 is formed with recesses 9, one recess being provided for each helicopter. Each recess is provided with inclined surfaces 10 and 11 at opposite end portions thereof, these surfaces being inclined in opposite directions to permit the respective helicopter to drop into place. When positioned in the recess, the upper surfaces of the helicopters are substantially flush with the surface of the wing 4.

Normally the helicopters are disposed in their respective recesses, but when power is applied and the helicopters tend to rotate, the blades of the helicopters engage the adjacent inclined surfaces 10 and 11, thereby operating as a cam means to elevate themselves. As the speed of the shafts 2 increase, the helicopters are moved upwardly along the squared portions 6.

When the power is shut off and the shafts 2 cease rotation, the helicopters drop into their respective recesses, but should they fail to register with recesses, the force of the wind against them will turn to the proper position for them to enter the recesses. It will be seen that when disposed in the recesses the helicopters present no impediment to the travel of the airplane.

Numerous changes in details of construction and arrangement may be effected without departing from the spirit of the invention, especially as defined in the appended claims.

What I claim as new and desire to secure by Letters Patent is:

1. In an airplane, a vertical shaft, a helicopter slidable on said shaft, a receptacle for said helicopter when not in use, and cam means in said receptacle operable upon rotation of said shaft to enable the helicopter automatically to lift itself from the receptacle.

2. In an airplane, a vertical shaft extending through the wing of the airplane, the wing being provided with a recess, oppositely inclined cam surfaces in the recess, and a helicopter on said shaft adapted to be positioned within the recess and adapted to automatically cam itself from the recess upon rotation thereof.

3. An airplane having a transverse wing, a pocket formed in said wing, a vertical shaft extending through said pocket, a helicopter rotatable with and slidable on said shaft, and oppositely inclined cam surfaces in said pocket, whereby upon rotation of said shaft the helicopter engaging said cam surfaces lifts itself automatically from the pocket.

In testimony whereof I have hereunto signed my name to this specification.

ROMANZO L. FOSKIT.